(12) United States Patent
Johansson et al.

(10) Patent No.: US 10,321,471 B2
(45) Date of Patent: Jun. 11, 2019

(54) CONVEYING USE OF EXCEPTION REPORTING TO CORE NETWORK NODES

(71) Applicant: TELEFONAKTIEBOLAGET LM ERICSSON (PUBL), Stockholm (SE)

(72) Inventors: Nicklas Johansson, Brokin (SE); Claes-Göran Persson, Mjölby (SE); John Walter Diachina, Garner, NC (US); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 15/400,634

(22) Filed: Jan. 6, 2017

(65) Prior Publication Data

US 2017/0202003 A1    Jul. 13, 2017

Related U.S. Application Data

(60) Provisional application No. 62/276,159, filed on Jan. 7, 2016.

(51) Int. Cl.
| | |
|---|---|
| *H04L 5/00* | (2006.01) |
| *H04W 4/24* | (2018.01) |
| *H04W 4/70* | (2018.01) |
| *H04W 24/10* | (2009.01) |
| *H04W 48/00* | (2009.01) |

(Continued)

(52) U.S. Cl.
CPC .......... *H04W 72/10* (2013.01); *H04L 5/0055* (2013.01); *H04W 4/24* (2013.01); *H04W 4/70* (2018.02); *H04W 24/10* (2013.01); *H04W 48/00* (2013.01); *H04W 72/1242* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2002/0163906 | A1* | 11/2002 | Diachina | H04W 4/90 370/349 |
| 2005/0265279 | A1* | 12/2005 | Markovic | H04W 76/11 370/328 |

(Continued)

OTHER PUBLICATIONS

Ericsson: "Random access for NB-IOT", 3GPP Draft; R2-154092, 3GPP TSG-RAN WG2 #91bis, Agenda item 7.16.3.1, Malmö, Sweden, Oct. 5-9, 2015, section "2.1 Preamble vs non-preamble based RACH", figures 1, 2; Observation 3, section "2.2 Random access based on Rel-13 feMTC", figure 3, section "2.3 Overload control", "Proposal 3", "3 Conclusion".

(Continued)

*Primary Examiner* — Alpus Hsu
*Assistant Examiner* — Camquyen Thai

(57) ABSTRACT

A radio access network node (e.g., Base Station Subsystem, Evolved Node B) and method are described herein for indicating to a core network node (e.g., Serving GPRS Support Node, Mobility Management Entity, CIoT Serving Gateway Node) usage of exception reports by a mobile station. In addition, a core network node (e.g., Serving GPRS Support Node, Mobility Management Entity, CIoT Serving Gateway Node) and method are described herein for receiving an indication of usage of exception reports by a mobile station.

14 Claims, 9 Drawing Sheets

(51) Int. Cl.
*H04W 72/10* (2009.01)
*H04W 72/12* (2009.01)
*H04W 88/08* (2009.01)

(56) References Cited

U.S. PATENT DOCUMENTS

| | | | | |
|---|---|---|---|---|
| 2010/0157887 | A1* | 6/2010 | Kopplin | H04L 47/10 370/328 |
| 2012/0113895 | A1* | 5/2012 | Diachina | H04L 47/2466 370/328 |
| 2013/0042011 | A1* | 2/2013 | Sugizaki | H04Q 3/0045 709/227 |
| 2016/0094996 | A1* | 3/2016 | Xiong | H04W 4/70 370/329 |
| 2016/0227514 | A1* | 8/2016 | Burbidge | H04W 68/08 |
| 2017/0164416 | A1* | 6/2017 | Yeddala | H04W 36/30 |

OTHER PUBLICATIONS

Ericsson: "Access control for NB-IoP", 3GPP Draft; R2-156136, 3GPP TSG-RAN WG2 #92, Agenda item 7.16.2.3, Anaheim, USA, Nov. 16-20, 2015, section "2 Discussion", section "2.2 Access control in NB-IoT", section "2.3 Exception vs normal reporting", Proposals: 1, 2, 8, 9, 10.
"LS on NB-loT work progress in RAN2", 3GPP Draft; R2-156971, 3GPP TSG-RAN2 Meeting #92, Release 13, Anaheim, USA, Nov. 16-20, 2015, section "1. Overall Description".
Ericsson LM: "Exception reporting for EC-EGPRS", 3GPP Draft; GP-160123, 3GPP TSG GERAN #69, Agenda item 5.2, 7.1.5.1.2, 7.2.5.2.5; St George's Bay, Malta, Feb. 15-19, 2016, the whole document.
NTT Docomo Inc: "Establishment Cause for NB-IoT UE", 3GPP Draft; R2-160416, 3GPP TSG-RAN WG2 NB-IoT Ad-hoc Meeting, Agenda item 5.2; Jan. 19-21, 2016, the whole document.
Ericsson LM et al., "New Work Item on Extended Coverage GSM (EC-GSM) for support of Cellular Internet of Things", GP-151039 (Revision of GP-150994), 3GPP TSG GERAN#67, Yinchuan, P.R. China, Aug. 10-14, 2015, the whole document.

3GPP TR 45.820 V13.1.0 (Nov. 2015), 3rd Generation Partnership Project; Technical Specification Group GSM/EDGE Radio Access Network; Cellular system support for ultra-low complexity and low throughput Internet of Things (CIoT)(Release 13), the whole document.
3GPP TS 48.018 V13.0.0 (Dec. 2015), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP)(Release 13), the whole document.
Ericsson LM, "Introduction of EC-EGPRS and Power Efficient Operation", 3GPP TSG-GERAN Meeting #68, GP-151111 CR 44.018-1027: (Rel-13), Anaheim, USA, Nov. 16-20, 2015, the whole document.
3GPP TS 44.064 V13.0.0 (Dec. 2015), 3rd Generation Partnership Project; Technical Specification Group Core Network and Terminals; Mobile Station—Serving GPRS Support Node (MS-SGSN); Logical Link Control (LLC) layer specification (Release 13), the whole document.
Qualcomm Incorporated, "Narrowband IOT", 3GPP TSG RAN Meeting #69, RP-151621, Phoenix, USA, Sep. 14-16, 2015, the whole document.
3GPP TR 23.720 V1.2.0(Nov. 2015), 3rd Generation Partnership Project; Technical Specification Group Services and System Aspects; Architecture enhancements for Cellular Internet of Things (Release 13), the whole document.
3GPP TS 29.281 V13.0.0 (Sep. 2015), 3rd Generation Partnership Project; Technical Specification Group Core Network and Terminals; General Packet Radio System (GPRS) Tunnelling Protocol User Plane (GTPv1-U)(Release 13), the whole document.
3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), the whole document.
3GPP TS 36.413 V13.1.0 (Dec. 2015), $3^{rd}$ Generation Partnership Project; Technical Specification Group Radio Access Network; Evolved Universal Terrestrial Radio Access Network (E-UTRAN); S1 Application Protocol (S1AP)(Release 13), the whole document.

* cited by examiner

Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.2.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |
| RRC Establishment Cause | M | | 9.2.1.3a | | YES | ignore |
| S-TMSI | O | | 9.2.3.6 | | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | ignore |
| GW Transport Layer Address | O | | Transport Layer Address 9.2.2.1 | Indicating GW Transport Layer Address if the GW is collocated with eNB. | YES | ignore |
| Relay Node Indicator | O | | 9.2.1.79 | Indicating a relay node. | YES | reject |
| GUMMEI Type | O | | ENUMERATED (native, mapped, ...) | | YES | ignore |
| Tunnel Information for BBF | O | | Tunnel Information 9.2.2.3 | Indicating HeNB's Local IP Address assigned by the broadband access provider, UDP port Number. | YES | ignore |
| SIPTO L-GW Transport Layer Address | O | | Transport Layer Address 9.2.2.1 | Indicating SIPTO L-GW Transport Layer Address if the SIPTO L-GW is collocated with eNB. | YES | ignore |
| LHN ID | O | | 9.2.1.92 | | YES | ignore |
| MME Group ID | O | | 9.2.3.44 | | YES | ignore |
| Exception Report | O | | | Indicating that the NAS-PDU carries an Exception Report | | |

FIG. 7

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| NAS-PDU | M | | 9.2.3.5 | | YES | reject |
| E-UTRAN CGI | M | | 9.2.1.38 | | YES | ignore |
| TAI | M | | 9.2.3.16 | | YES | ignore |
| GW Transport Layer Address | O | | Transport Layer Address 9.2.2.1 | Indicating GW Transport Layer Address if the GW is collocated with eNB. | YES | ignore |
| SIPTO L-GW Transport Layer Address | O | | Transport Layer Address 9.2.2.1 | Indicating SIPTO L-GW Transport Layer Address if the SIPTO L-GW is collocated with eNB. | YES | ignore |
| LHN ID | O | | 9.2.1.92 | | YES | ignore |
| Exception Report | O | | | Indicating that the NAS-PDU carries an Exception Report | | |

Direction: eNB → MME

FIG. 8

CONVEYING USE OF EXCEPTION REPORTING TO CORE NETWORK NODES

CLAIM OF PRIORITY

This application claims the benefit of priority to U.S. Provisional Application Ser. No. 62/276,159, filed on Jan. 7, 2016, the entire contents of which are hereby incorporated by reference herein for all purposes.

TECHNICAL FIELD

The present disclosure relates to a radio access network node (e.g., Base Station Subsystem, Evolved Node B) and method for indicating to a core network node (e.g., Serving GPRS Support Node, Mobility Management Entity, CIoT Serving Gateway Node) usage of exception reports by a mobile station. In addition, the present disclosure relates to a core network node (e.g., Serving GPRS Support Node, Mobility Management Entity, CIoT Serving Gateway Node) and method for receiving an indication of usage of exception reports by a mobile station.

BACKGROUND

The following abbreviations and terms are herewith defined, at least some of which are referred to within the following description of the present disclosure.
3GPP 3rd-Generation Partnership Project
AGCH Access Grant Channel
AS Access Stratum
ASIC Application Specific Integrated Circuit
BLER Block Error Rate
BSS Base Station Subsystem
BSSGP Base Station Subsystem GPRS Protocol
CC Coverage Class
CIoT Cellular Internet of Things
CN Core Network
CR Change Request
DRB Data Radio Bearer
DL Downlink
EC Extended Coverage
EC-GSM Extended Coverage Global System for Mobile Communications
EC-RACH Extended Coverage-Random Access Channel
eNB Evolved Node B
DL Downlink
DSP Digital Signal Processor
ECM EPS Connection Management
EDGE Enhanced Data rates for GSM Evolution
EGPRS Enhanced General Packet Radio Service
EPS Evolved Packet System
E-UTRA Evolved Universal Terrestrial Radio Access
GSM Global System for Mobile Communications
GERAN GSM/EDGE Radio Access Network
GGSN Gateway GPRS Support Node
GPRS General Packet Radio Service
GTP GPRS Tunnelling Protocol
GTP-C GTP Control Plane
GTP-U GTP User Plane
HARQ Hybrid Automatic Repeat Request
HLR Home Location Register
IE Information Element
IoT Internet of Things
K_eNB eNB security key
LLC Logical Link Control
LTE Long-Term Evolution
MAC Media Access Control
MCS Modulation and Coding Scheme
MME Mobility Management Entity
MS Mobile Station
MTC Machine Type Communications
NAS Non Access Stratum
NB Node B
NB-IOT Narrowband Internet of Things
NB-LTE Narrowband Long-Term Evolution
NCC Next Hop Chaining Counter
PCC Policy and Charging Control
PCRF Policy and Charging Rules Function
PDN Packet Data Network
PDU Protocol Data Unit
P-GW Packet Data Network GateWay
QoS Quality of Service
RACH Random Access Channel
RAN Radio Access Network
RAT Radio Access Technology
RoHC Robust Header Compression
RRC Radio Resource Control
S1AP S1 Application Protocol
SAPI Service Access Point Identifier
SGSN Serving GPRS Support Node
S-GW Serving GateWay
SMS Short Message Service
TDMA Time Division Multiple Access
TEID Tunnel Endpoint Identifier
TR Technical Report
TS Technical Specification
TSG Technical Specification Group
UE User Equipment
UL Uplink
WCDMA Wideband Code Division Multiple Access
WiMAX Worldwide Interoperability for Microwave Access
Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.
Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Cellular Internet of Things (CIoT) devices: CIoT devices are IoT devices that establish connectivity using cellular networks.

Machine Type Communication (MTC) devices: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

At the Third Generation Partnership Project (3GPP) Technical Specification Group (TSG) GSM/EDGE Radio Access Network (GERAN) meeting #67, a new work item entitled "New Work Item on Extended Coverage GSM (EC-GSM) for support of Cellular Internet of Things" (CIoT) was discussed and approved in GP-151039 (dated: Aug. 10-14, 2015) with the intention to improve coverage with 20 dB, to improve battery life time and to decrease device complexity. The contents of GP-151039 are hereby incorporated by reference herein for all purposes. The work is based on the Extended Coverage Global System for Mobile (EC-GSM) solution as captured in Chapter 6.2 in the 3GPP Technical Report (TR) 45.820 v13.1.0 (2015-11) entitled "Technical Specification Group GSM/EDGE Radio Access Network; Cellular system support for ultra-low complexity and low throughput Internet of Things (CIoT) (Release 13)" (referred to herein as the "Cellular IoT study report"), the contents of which are hereby incorporated by reference herein for all purposes.

At the 3GPP TSG GERAN meeting #69, there was discussed a new work item RP-151621 (dated: Sep. 14-16, 2015) entitled "New Work Item: NarrowBand IOT (NB-IOT)," with the objective to specify a radio access for CIoT, based to a great extent on a non-backward-compatible variant of Evolved Universal Terrestrial Radio Access (E-UTRA), that addresses improved indoor coverage, support for massive number of low throughput devices, low delay sensitivity, ultra-low device cost, low device power consumption and (optimized) network architecture. The contents of RP-151621 are hereby incorporated by reference herein for all purposes. The basis for this work item is the solution Narrow Band Long Term Evolution (NB-LTE) captured in the Cellular IoT study report.

Within the Cellular IoT study report, there was a 10 second latency requirement related to exception reporting, which in turn resulted in supporting a unique code point in the Channel Request Message or in general when the device or user equipment (UE) accesses the network allowing the Base Station System (BSS)/RAN to prioritize exception reports when it comes to resource utilization.

The use of exception reports is controlled (e.g., triggered) by an application running on the IoT device/UE. One typical use case for IoT devices is metering, such as particular water metering. Such a device will regularly send non-prioritized metering reports to a server using low priority packet transfers, and only when there is an exception (e.g., a water leakage) will the device send an exception report by requesting a high priority packet transfer. Similarly, a fire alarm type device may regularly send keep-alive messages in non-prioritized reports to a server and only send an exception report when there is a fire alarm.

A problem with the existing solution is that, from a radio interface perspective, there is no way to ensure responsible use of exception reports, as they are entirely controlled by the application. In other words, there is a risk that the application uses the code point associated with exception reporting (high priority), as discussed in GP-151111 (dated: Nov. 16-20, 2015) (the contents of which are hereby incorporated by reference herein for all purposes) Change Request (CR) 44.018-1027 Introduction of EC-EGPRS and Power Efficient Operation (Rel-13), also for normal reporting with the purpose to secure prioritization of traffic associated with a particular device and/or application.

As the network resources on the radio interface is a scarce resource, the abuse of the code point associated with exception reporting may ultimately lead to delayed network service for all types of traffic, i.e., for traffic related to normal and prioritized (exception) reporting.

SUMMARY

A RAN node (e.g., BSS, eNB), a CN node (e.g., SGSN, MME, C-SGN), and various methods for addressing the aforementioned problems are described in the independent claims. Advantageous embodiments of the RAN node (e.g., BSS, eNB), the CN node (e.g., SGSN, MME, C-SGN), and various methods are further described in the dependent claims.

In one aspect, the present disclosure provides a RAN node configured to communicate with a mobile station and a CN node. The RAN node comprises a processor and a memory that stores processor-executable instructions, wherein the processor interfaces with the memory to execute the processor-executable instructions, whereby the RAN node is operable to perform a first receive operation, an assign operation, a second receive operation, and a transmit operation. In the first receive operation, the RAN node receives, from the mobile station, a channel request. In the assign operation, the RAN node assigns radio resources to the mobile station for transmission of data as an exception report. In the second receive operation, the RAN node receives, from the mobile station, data transmitted as an exception report on the assigned radio resources. In the transmit operation, the RAN node transmits, to the CN node, the data transmitted by the mobile station as an exception report and an indication that the mobile station transmitted data as an exception report with high priority. An advantage of the RAN node performing these operations is that the CN node is made aware of when a mobile station has transmitted data that has been treated as a high priority report on the radio interface, and the CN node can then use this information for charging purposes or other means to limit the misuse of uplink data transmissions treated as exception reports when sent across the radio interface.

In another aspect, the present disclosure provides a method in a RAN node configured to communicate with a mobile station and a CN node. The method comprises a step of first receiving, a step of assigning, a step of second receiving, and a step of transmitting. In the step of first receiving, a channel request is received from the mobile station. In the step of assigning, radio resources are assigned to the mobile station for transmission of data as an exception report. In the step of second receiving, data transmitted as an exception report on the assigned radio resources are received from the mobile station. In the step of transmitting, the data transmitted by the mobile station as an exception report and an indication that the mobile station transmitted data as an exception report with high priority are transmitted to the CN node. An advantage of performing these steps of the method in the RAN node is that the CN node is made aware of when a mobile station has transmitted data that has been treated as a high priority report on the radio interface, and the CN node can then use this information for charging purposes or other means to limit the misuse of uplink data transmissions treated as exception reports when sent across the radio interface.

In yet another aspect, the present disclosure provides a CN node configured to communicate with a RAN node and a mobile station. The CN node comprises a processor and a memory that stores processor-executable instructions, wherein the processor interfaces with the memory to execute the processor-executable instructions, whereby the CN node is operable to perform a receive operation and a perform operation. In the receive operation, the CN node receives, from the RAN node, data transmitted by the mobile station as an exception report and an indication that the mobile station transmitted data as an exception report with high priority. In the perform operation, the CN node performs one or more actions in response to receiving the indication. An advantage of the CN node performing these operations is that the CN node is made aware of when a mobile station has transmitted data that has been treated as a high priority report on the radio interface, and the CN node can then use this information for charging purposes or other means to limit the misuse of uplink data transmissions treated as exception reports when sent across the radio interface.

In still yet another aspect, the present disclosure provides a method in a CN node configured to communicate with a RAN node and a mobile station. The method comprises a step of receiving and a step of performing. In the step of receiving, data transmitted by the mobile station as an exception report and an indication that the mobile station transmitted data as an exception report with high priority are received from the RAN node. In the step of performing, one or more actions are performed in response to receiving the indication. An advantage of performing these steps of the method in the CN node is that the CN node is made aware of when a mobile station has transmitted data that has been treated as a high priority report on the radio interface, and the CN node can then use this information for charging purposes or other means to limit the misuse of uplink data transmissions treated as exception reports when sent across the radio interface.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 7 is an illustration of the 'Initial UE message' message with the addition of the proposed new IE in accordance with an embodiment of the present disclosure;

FIG. 8 is an illustration of the 'Uplink NAS Transport' message with the addition of the proposed new IE in accordance with an embodiment of the present disclosure;

DETAILED DESCRIPTION

Figure 1:
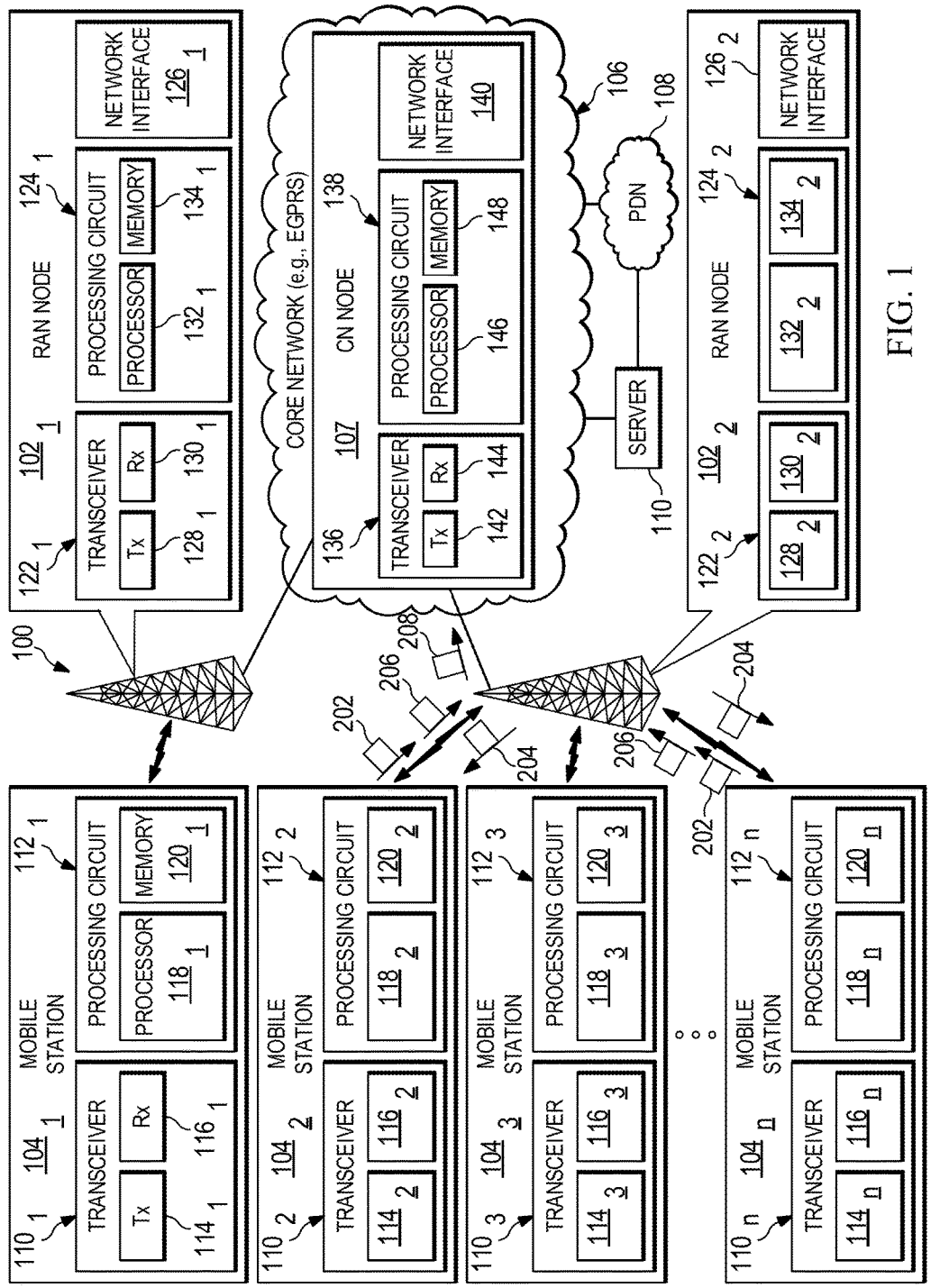
FIG. 1 is a diagram of an exemplary wireless communication network which includes a CN node, multiple RAN nodes, and multiple mobile stations configured in accordance with an embodiment of the present disclosure.

A discussion is provided herein first to describe an exemplary wireless communication network that includes a CN node (e.g., SGSN, MME, C-SGN), multiple RAN nodes (e.g., BSSs, eNodeBs), and multiple mobile stations (e.g., wireless devices, MTC devices, CIoT devices) in accordance with an embodiment of the present disclosure (see FIG. 1). Then, a discussion is provided to disclose various techniques that the RAN nodes (e.g., BSSs, eNodeBs) can use for indicating to a CN node (e.g., SGSN, MME, C-SGN) usage of exception reports by a mobile station (e.g., wireless device, MTC device, CIoT device) and to disclose various techniques that the CN nodes (e.g., SGSNs, MMEs, C-SGNs) can use for receiving the indication and performing one or more actions in response to receiving the indication (see FIGS. 2-8). Thereafter, a discussion is provided to explain the basic functionalities-configurations of the RAN nodes (e.g., BSSs, eNodeBs) and the CN nodes (e.g., SGSNs, MMEs, C-SGNs) in accordance with different embodiments of the present disclosure (see FIGS. 9-12).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple mobile stations $104_1$, $104_2$, $104_3$ . . . $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, EC-GSM, WCDMA, LTE, and WiMAX systems.

The wireless communication network 100 includes the RAN nodes $102_1$ and $102_2$ (wireless access nodes—only two shown) which provide network access to the mobile stations $104_1$, $104_2$, $104_3$ ... $104_n$. In this example, the RAN node $102_1$ is providing network access to mobile station $104_1$ while the RAN node $102_2$ is providing network access to mobile stations $104_2$, $104_3$ ... $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The mobile stations $104_1$, $104_2$, $104_3$ ... $104_n$ may communicate with one or more servers 110 (only one shown) connected to the core network 106 and/or the PDN 108.

The mobile stations $104_1$, $104_2$, $104_3$ ... $104_n$ may refer generally to an end terminal (user) that attaches to the wireless communication network 100, and may refer to either a MTC device (e.g., a smart meter) or a non-MTC device. Further, the term "mobile station" is generally intended to be synonymous with the term mobile device, wireless device, "User Equipment," or UE, as that term is used by 3GPP, and includes standalone mobile stations, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each mobile station $104_1$, $104_2$, $104_3$ ... $104_n$ may include a transceiver circuit $110_1$, $110_2$, $110_3$ ... $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding mobile station $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard, and the EC-GSM standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding mobile station $104_1$, $104_2$, $104_3$ ... $104_n$. The program code may include code for performing the procedures as described hereinafter.

Each RAN node $102_1$ and $102_2$ (wireless access node $102_1$ and $102_2$) (e.g., BSS 102, eNB 102) may include a transceiver circuit $122_1$ and $122_2$ for communicating with mobile stations $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard, and the EC-GSM standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter.

The CN node 107 (e.g., SGSN 107, MME 107, C-SGN 107, GGSN 107', S-GW 107', P-GW 107') may include a transceiver circuit 136 for communicating with the RAN nodes $102_1$ and $102_2$ and possibly one or more other CN nodes 107, a processing circuit 138 for processing signals transmitted from and received by the transceiver circuit 136 and for controlling the operation of the CN node 107, and a network interface 140 for communicating with the RAN nodes $102_1$ and $102_2$. The transceiver circuit 136 may include a transmitter 142 and a receiver 144, which may operate according to any standard, e.g., the GSM/EDGE standard, and the EC-GSM standard. The processing circuit 138 may include a processor 146 and a memory 148 for storing program code for controlling the operation of the CN node 107. The program code may include code for performing the procedures as described hereinafter.

Techniques for Indicating Usage of Exception Reports on the Radio Interface

Generally, the solution described herein is for the RAN nodes $102_2$ to inform the CN nodes 107 about the use of exception reports on the radio interface in order to e.g., link the use of exception reports to charging or to settings/permissions in e.g., the Home Location Register (HLR).

Solutions for EC-GSM

In a first embodiment, the Serving GPRS Support Node (SGSN) 107 (i.e., the CN node 107) is made aware of the use of exception reporting through a modification of the UL-UNITDATA Protocol Data Unit (PDU), which transfers an MS's $104_2$ Logical Link Control PDU (LLC PDU) and its associated radio interface information across the Gb-interface. 3GPP Technical Specification (TS) 48.018 v13.0.0 (2015-12) entitled "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 13)" (herein 3GPP TS 48.018), the contents of which are hereby incorporated by reference herein for all purposes, describes the content of the UL-UNITDATA PDU in Table 10.2.2 before the proposed modification.

As illustrated in the modified Table 10.2.2 below, the UL-UNITDATA PDU has been updated to include a new Exception Reporting information element (IE). Whenever an EC-GSM device/MS $104_2$ accesses the system for the purpose of Exception Reporting, the EC-GSM device/MS $104_2$ sends a Random Access Channel (RACH) request to the Base Station Subsystem (BSS) $102_2$ (i.e., RAN node $102_2$) including an indication of high priority (i.e., exception report). This allows the BSS $102_2$ to prioritize allocation of resources associated with this particular channel request. This also means that whenever an EC-GSM device/MS $104_2$ sends uplink data comprising an exception report within an LLC PDU, the BSS $102_2$ may add the Exception Report IE to the corresponding UL-UNITDATA PDU (i.e., containing that LLC PDU) that the BSS 102₂ sends to the SGSN 107 and thus make the SGSN 107 aware that the UL-UNIT-DATA PDU comprises a report that has been treated as a high priority report on the radio interface.

Figure 2:
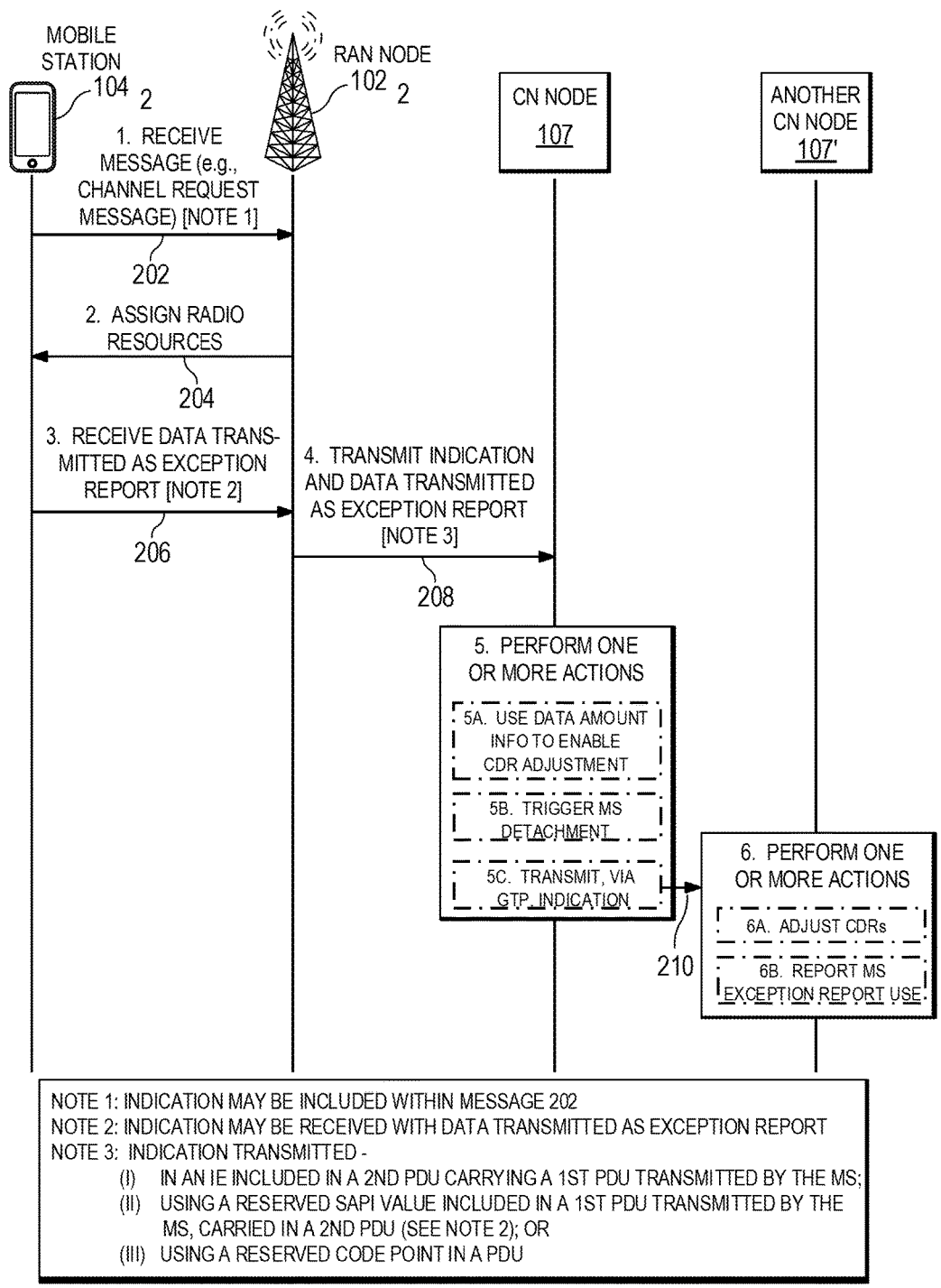
FIG. 2 is a signal flow diagram illustrating indicating to a CN node usage of exception reports by a mobile station in accordance with an embodiment of the present disclosure.

FIG. 2 is a signal flow diagram illustrating indicating to a CN node 107 (e.g., SGSN 107, MME 107, C-SGN 107) usage of exception reports by an MS 104₂ (e.g., wireless device 104₂, MTC device 104₂, CIoT device 104₂) in accordance with an embodiment of the present disclosure. The above first embodiment will be described further with reference to FIG. 2. In particular, in Step 1, a RAN node 102₂ (e.g., BSS 102₂, eNB 102₂) receives, from the MS 104₂, a message 202 that is, or includes, a channel request. The channel request may indicate high priority for transmitting data as an exception report. That is, an indication of high priority for transmitting data may be included within the message 202 that the RAN node 102₂ receives from the MS 104₂, as stated in Note 1. The MS 104₂ may transmit this message 202 on the RACH or EC-RACH to the RAN node 102₂. In some embodiments, the message 202 is an EC-EGPRS PACKET CHANNEL REQUEST message or an EC-EGPRS PACKET DOWNLINK ACK/NACK message including a channel request, indicating high priority.

In Step 2, the RAN node 102₂ assigns radio resources (e.g., an uplink EC-EGPRS Temporary Block Flow (TBF)) to the MS 104₂, e.g., by transmitting an assignment message 204, for transmission of data as an exception report. In assigning the radio resources, the RAN node 102₂ prioritizes allocation of radio resources associated with this particular channel request, for example, when the indication of high priority is included within the message 202.

In Step 3, the RAN node 102₂ receives, from the MS 104₂, e.g., in a message 206, data transmitted as an exception report on the assigned radio resources. In some embodiments, the MS 104₂ sends uplink data comprising an exception report in an LLC PDU (i.e., message 206) using the uplink EC-EGPRS TBF established in response to the EC-EGPRS PACKET CHANNEL REQUEST message or the EC-EGPRS PACKET DOWNLINK ACK/NACK message transmitted by the MS 104₂.

In Step 4, the RAN node 102₂ transmits, to the CN node 107, e.g., in a message 208, the data transmitted by the MS 104₂ as an exception report and an indication that the MS 104₂ transmitted data as an exception report with high priority. The RAN node 102₂ may use a number of means to transmit the indication to the CN node 107 (see Note 3). In the first embodiment discussed above, the BSS 102₂ adds the Exception Report IE (i.e., the indicator) to the corresponding UL-UNITDATA PDU (i.e., the message 208), which also carries the LLC PDU (i.e., message 206) sent by the MS 104₂ using the uplink EC-EGPRS TBF. The BSS 102₂ transmits the UL-UNITDATA PDU to the SGSN 107, making the SGSN 107 aware that the UL-UNITDATA PDU comprises a report that has been treated as a high priority report on the radio interface.

TABLE 10.2.2

UL-UNITDATA PDU content

| Information element | Type/Reference | Presence | Format | Length |
|---|---|---|---|---|
| PDU type | PDU type/11.3.26 | M | V | 1 |
| TLLI | TLLI/11.3.35 | M | V | 4 |
| QoS Profile | QoS Profile/11.3.28 | M | V | 3 |
| Cell Identifier (note 5) | Cell Identifier/11.3.9 | M | TLV | 10 |
| PFI | PFI/11.3.42 | O | TLV | 3 |

TABLE 10.2.2-continued

UL-UNITDATA PDU content

| Information element | Type/Reference | Presence | Format | Length |
|---|---|---|---|---|
| LSA Identifier List | LSA Identifier List/11.3.18 | O | TLV | 3-? |
| Redirect Attempt Flag (Note 3) | Redirect Attempt Flag/11.3.111 | O | TLV | 3 |
| IMSI (note 2) | IMSI/11.3.14 | O | TLV | 5-10 |
| Unconfirmed send state variable (note 4) | Unconfirmed send state variable/11.3.114 | O | TLV | 4 |
| Selected PLMN ID (note 5) | Selected PLMN ID/11.3.118 | O | TLV | 5 |
| Selected Operator (note 6, 7) | PLMN Identity/11.3.124 | O | TLV | 5 |
| CS Registered Operator (note 6, 8) | PLMN Identity/11.3.124 | O | TLV | 5 |
| Alignment octets | Alignment octets/11.3.1 | O | TLV | 2-5 |
| Exception Report | Exception Report/11.3.xx | O | TLV | 3 |
| LLC-PDU (note 1) | LLC-PDU/11.3.15 | M | TLV | 2-? |

NOTE 1:
The LLC-PDU Length Indicator may be zero.
NOTE 2:
IMSI shall be included if available and if Redirect Attempt Flag is present.
NOTE 3:
This element indicates that the core network shall respond with either Redirection Indication IE or Redirection Completed IE in DL_UNITDATA
NOTE 4:
Unconfirmed send state variable shall be included if received in the previous DL_UNITDATA.
NOTE 5:
Selected PLMN ID shall be included in the case of a mobile station supporting network sharing when a foreign TLLI or a random TLLI is included in the UL-UNIDATA PDU; in such a case the Common PLMN ID shall be included within the Cell Identifier IE
NOTE 6:
Only one of these two optional IEs shall be present in the message.
NOTE 7:
This IE indicates the BSS selected CN operator. It is only included if the BSS supports CS/PS coordination enhancements.
NOTE 8:
This IE is included if the BSS supports CS/PS coordination enhancements and if the mobile station is served by one of the shared CN operators in the CS domain.

One possible realization of the Exception Reporting Information Element for inclusion in 3GPP TS 48.018 is shown below.

11.3.xxx Exception Report

The purpose of the Exception Report information element is to make the SGSN aware that the current UL-UNITDATA PDU contains a report that has been treated as a high priority report on the radio interface.

The Exception Reporting information element is coded as shown in Table 11.3.xxx/3GPP TS 48.018.

TABLE 11.3.xxx

| | | | Exception Report | | | | |
|---|---|---|---|---|---|---|---|
| 8 | 7 | 6 | 5 | 4 | 3 | 2 | 1 |
| Octet 1 | | | | IEI | | | |
| Octet 2, 2a | | | | Length Indicator | | | |
| Octet 3 | | | | spare | | | |

In a second embodiment, a reserved Service Access Point Identifier (SAPI) value is used to make the SGSN 107 (i.e., CN node 107) aware that a particular LLC PDU comprises user data and is used for exception reporting in particular.

One example of using reserved SAPI values in the LLC header to make the SGSN 107 aware of the use of exception reporting is shown in Table 1 below. The LLC protocol and the allocated SAPI values are specified in 3GPP TS 44.064 v13.0.0 (2015-12) entitled "Technical Specification Group Core Network and Terminals; Mobile Station—Serving GPRS Support Node (MS-SGSN); Logical Link Control (LLC) layer specification (Release 13)" (herein 3GPP TS 44.064), the contents of which are hereby incorporated by reference herein for all purposes. 3GPP TS 44.064 at Section 6.2.3, Table 2 provides the allocation of SAPI values before the proposed use of a reserved SAPI value.

SAPI allows 16 service access points to be specified, but up until now, only 8 service access points have been defined.

One proposal is to modify one of the reserved SAPI values (e.g., SAPI 1010, as illustrated below in Table 1) to signal that the current LLC PDU is carrying an exception report.

TABLE 1

Allocation of SAPI values

| SAPI | Related Service | SAP Name |
|---|---|---|
| 0000 | Reserved | — |
| 0001 | GPRS Mobility Management | LLGMM |
| 0010 | Tunnelling of messages 2 | TOM2 |
| 0011 | User data 3 | LL3 |
| 0100 | Reserved | — |
| 0101 | User data 5 | LL5 |
| 0110 | Reserved | — |
| 0111 | SMS | LLSMS |
| 1000 | Tunnelling of messages 8 | TOM8 |
| 1001 | User data 9 | LL9 |
| 1010 | User data 10 (Exception Reporting) | LL10 |
| 1011 | User data 11 | LL11 |
| 1100 | Reserved | — |
| 1101 | Reserved | — |
| 1110 | Reserved | — |
| 1111 | Reserved | — |

This second embodiment will be described further with reference to FIG. 2. In particular, Note 2 of Step 3 states that the indication may be transmitted with the data transmitted as the exception report. That is, when the RAN node $102_2$ receives, from the MS $104_2$, e.g., in message 206, data transmitted as an exception report on the assigned radio resources, the RAN node $102_2$ may also receive (e.g., in the same message 206) the indication that the MS $104_2$ transmitted data as an exception report with high priority. In particular, the indication is signaled using a reserved SAPI value included in an LLC PDU transmitted by the MS $104_2$, and the indication is then transmitted, by the RAN node $102_2$ to the CN node 107, in an UL-UNITDATA PDU (e.g., message 208) carrying the LLC PDU.

In a third embodiment that is a variant of the second embodiment, both the previously reserved SAPI value and the channel request of message 202 are used to indicate high priority for the MS $104_2$ to transmit data as an exception report. Thus, a first indication of high priority would be included within received message 202 (i.e., as per Note 1), and a second indication would be transmitted with the data transmitted as the exception report (i.e., as per Note 2), where this second indication is signaled using a reserved SAPI value included in an LLC PDU transmitted by the MS $104_2$. This would allow for an easier RAN node $102_2$ (e.g., BSS $102_2$) implementation since a new IE (e.g., Exception Report IE) would not need to be introduced or modified for the UL-UNITDATA PDU, and yet the RAN node $102_2$ would still be made aware of when to prioritize radio resource allocations and will still (implicitly) relay the second indication of exception report usage to the CN node 107 via the new LLC SAPI value. In a fourth embodiment, a reserved code point in any of the existing UL UNITDATA PDU IEs is used to make the SGSN 107 (i.e., CN node 107) aware that a particular LLC PDU comprises user data sent over the radio interface as an exception report.

One example of using a reserved code point in an existing UL UNITDATA PDU IE is illustrated below where Table 11.3.28.b, in 3GPP TS 48.018 referenced above, for coding of the Precedence field in the Quality of Service (QoS) Profile IE has been updated (e.g., at coding 101) to indicate that the UL UNITDATA PDU is being used for exception reporting.

TABLE 11.3.28.b

Precedence coding

| | semantic | |
|---|---|---|
| coding | DL-UNITDATA | UL-UNITDATA |
| 000 | High priority | Radio priority 1 |
| 001 | Normal priority | Radio priority 2 |
| 010 | Low priority | Radio priority 3 |
| 011 | Reserved | Radio priority 4 |
| 100 | Reserved | Radio Priority Unknown |
| 101 | Reserved | Exception Reporting |

Once the CN node 107 is made aware of the usage of exception reporting, the CN node 107 can use this information for charging purposes or other means to limit the misuse of uplink data transmissions treated as exception reports when sent across the radio interface. This is illustrated in FIG. 2 at Step 5, where in response to receiving the indication of exception report usage, the CN node 107 performs one or more actions.

In a fifth embodiment, the SGSN 107 (i.e., CN node 107) uses the indication of exception report usage along with information about the amount of data being transferred as an Exception Report to enable adjustment of the Charging Data Records (CDRs) according to an operator's policy taking possible business agreements into consideration. This is illustrated at Step 5A.

In a sixth embodiment, the SGSN 107 (i.e., CN node 107) triggers policing action e.g., detaches the device/MS $104_2$ from the network 100 when the usage of Exception Reports is prohibited/not allowed due to e.g., a business agreement or an operator's local policies. This is illustrated at Step 5B.

In a seventh embodiment, the SGSN 107 (i.e., CN node 107) includes the Exception Report indication in the GPRS Tunnelling Protocol (GTP) e.g., in the GTP User Plane (GTP-U) header extension when the carried user plane is an Exception Report. This is illustrated at Step 5C. In some embodiments, the CN node 107 can transmit the indication of exception report usage, via GTP, to another CN node 107', which performs one or more actions in response to receiving the indication. This is illustrated at Step 6, where the indication is transmitted in a message 210.

In an eighth embodiment, the Gateway GPRS Support Node (GGSN) 107'/Packet Data Network Gateway (P-GW) 107' (i.e., another CN node 107') adjusts the CDRs according to the business agreements or an operator's local policy. This is illustrated at Step 6A.

In a ninth embodiment, the GGSN 107'/P-GW 107' (i.e., another CN node 107') reports usage of Exception Reporting to the Policy and Charging Control (PCC) architecture (e.g., Policy and Charging Rules Function (PCRF)) where further specified operator's local policy dependent actions can be triggered, e.g., change of the QoS parameters or other procedures. This is illustrated at Step 6B.

Although FIG. 2 illustrates, and the present disclosure provides, several embodiments of possible actions performed by the CN node 107 and/or another CN node 107' in response to receiving indication of exception reporting usage, it should be understood that the invention is not merely limited to these disclosed embodiments. Rather, one of skill in the art could consider other means to limit the misuse of uplink data transmissions treated as exception reports when sent across the radio interface without departing from the present disclosure that has been set forth.

Solutions for NB-IOT

Two solutions are under normative work for 3GPP Rel-13 in the context of CIoT and NBIOT. Referencing 3GPP TR 23.720 v1.2.0 (2015-11) entitled "Technical Specification Group Services and System Aspects; Architecture enhancements for Cellular Internet of Things (Release 13)" (herein 3GPP TR 23.720), the contents of which are hereby incorporated by reference herein for all purposes:

Solution 2 in clause 6.2 is considered as the basis for the normative work for support of infrequent small data transmission (for IP data, non-IP data and Short Message Service (SMS)). Support of solution 2 is mandatory for both the UE/MS and the network.

Solution 18 in clause 6.18 is considered as the basis for the normative work for support of infrequent small data transmission (for IP data and SMS). Support of solution 18 is optional for both the UE/MS and the network. Solution 18 can adopt other solutions (e.g., solution 10, solution 15) to provide support for non-IP data.

Solution 1 for 'Solution 18'

Figures 3, 4:
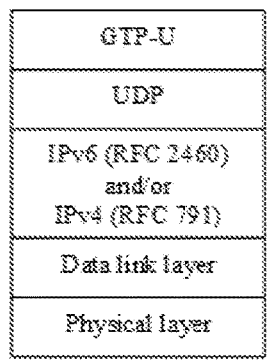
FIG. 3 is an illustration of the transport network layer for data streams over S1.
FIG. 4 is an illustration of an outline of the GTU Header.

In the first embodiment, a new Information Element (IE) indicating usage of Exception Reporting is added using a free code point in the GTP-U header Extension on the S1-U interface indicating that the carried user plane is an Exception Report. FIG. 3 illustrates the transport network layer for data streams over S1. FIG. 4 illustrates an outline of the GTU Header, which is included as FIG. 5.1-1 in 3GPP TS 29.281 v13.0.0 (2015-09) entitled "Technical Specification Group Core Network and Terminals; General Packet Radio System (GPRS) Tunnelling Protocol User Plane (GTPv1-U) (Release 13)," the contents of which are hereby incorporated by reference herein for all purposes.

In the second embodiment, the Serving Gateway (S-GW) 107' (i.e., CN node 107') forwards the information indicating Exception Report to the target P-GW 107' (i.e., another CN node 107') e.g., using the GTP-U header Extension.

In the third embodiment, the P-GW 107' (i.e., another CN node 107') uses that information about the amount of data being transferred as an Exception Report to enable adjustment of the CDRs according to an operator's policy taking possible business agreements into consideration.

In the fourth embodiment, the P-GW 107' (i.e., another CN node 107') reports usage of Exception Reporting to the PCC (e.g., PCRF) where an operator's local policy dependent actions can be triggered, e.g., change of the QoS parameters or policing procedures like 'UE Detach' when the usage of Exception Reporting is not allowed/prohibited.

In the fifth embodiment, the S-GW 107' (i.e., another CN node 107') reports usage of the Exception reporting to the Mobility Management Entity (MME) 107 ('C-SGN' 107) (i.e., CN node 107) to enable adjustment of CDRs.

In the sixth embodiment, the MME 107 ('C-SGN' 107) (i.e., CN node 107) triggers policing functions like 'UE Detach' taking an operator's local policies and/or subscription data into consideration.

Solution 2 for 'Solution 18'

In the first embodiment, the evolved Node B (eNB or eNodeB) 102$_2$ (i.e., RAN node 102$_2$) adds a new Information Element (IE) to a new S1 Application Protocol (S1AP) message 'S1AP-UE Context Active' during the 'Radio Resource Control (RRC) Resume' procedure. The 'RRC Resume' procedure before the addition of the proposed new IE is illustrated as Resumption of a previously suspended RRC connection in FIG. 6.5.1.3-1 of 3GPP TR 23.720.

Figure 5:
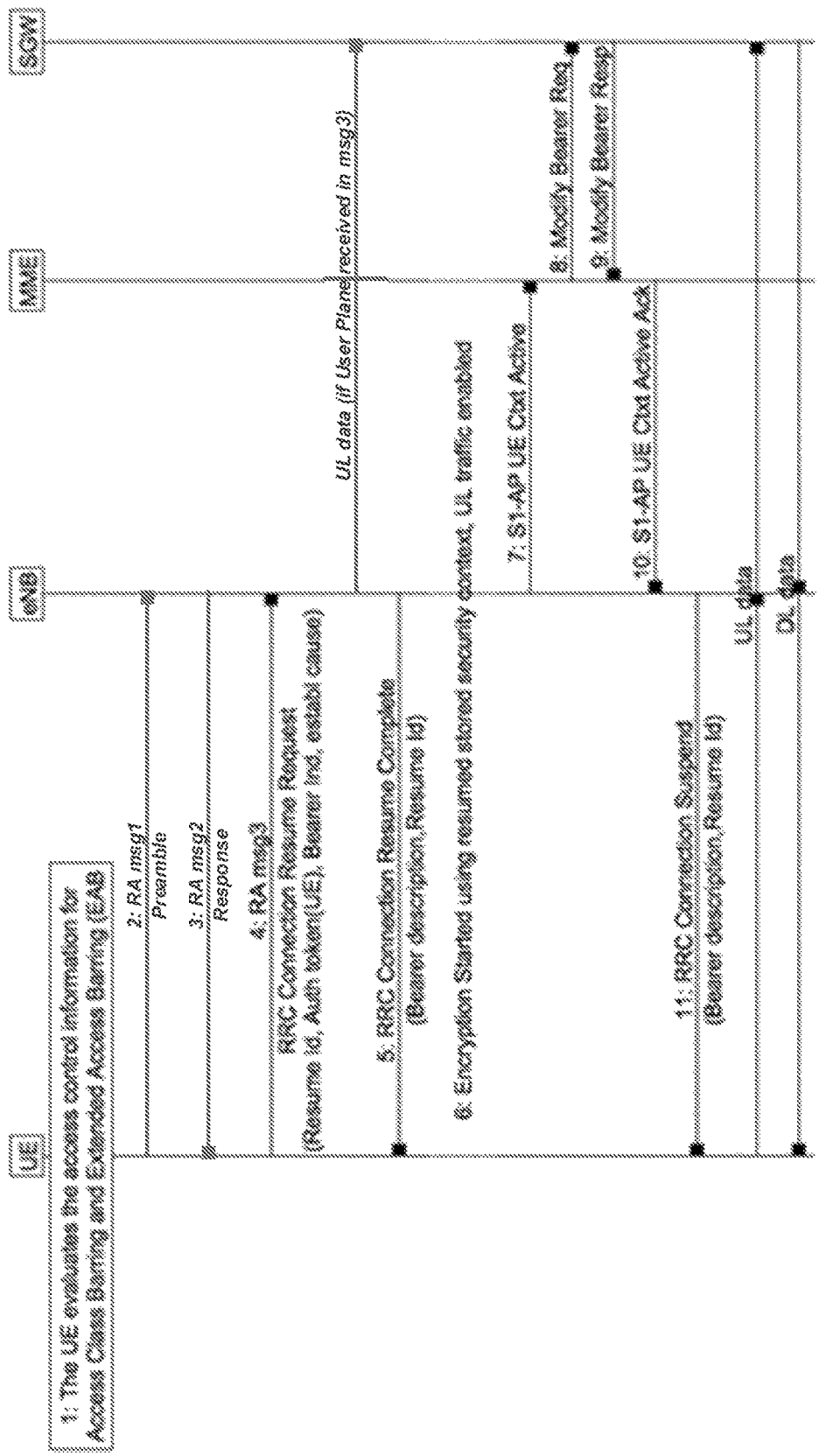
FIG. 5 is an illustration of the 'RRC Resume' procedure with the addition of a proposed new IE in accordance with an embodiment of the present disclosure.

FIG. 5 illustrates the 'RRC Resume' procedure with the addition of the proposed new IE. The final definition of the message and procedure will be decided during ongoing Rel-13 normative work. Steps 1, 2, and 3 follow the legacy procedure when a UE accesses the network from RRC Idle state.

4. In msg3, a new RRC Connection Resume Request message, the UE includes its Resume Id, Authentication Token, Bearer Ind, and Establishment Cause. The eNB uses Resume Id to associate the UE with the previously stored UE Context. Additionally, msg3 can also include User Plane multiplexed by Media Access Control (MAC) as per existing specifications where the resumed stored security context is used to encrypt the User Plane.

NOTE: The Authentication Token can be based on the existing means to authenticate a UE at RRC re-establishment as specified in 3GPP TS 36.331 v13.0.0 (2015-12) entitled "Technical Specification Group Radio Access Network; Evolved Universal Terrestrial Radio Access (E-UTRA); Radio Resource Control (RRC); Protocol specification (Release 13)," the contents of which are hereby incorporated by reference herein for all purposes. It is assumed that the final means for UE authentication at RRC Resume will be decided by RAN WG2 with assistance of SA3 if needed.

5. In message 4, designated here as RRC Connection Resume Complete, the network indicates which Data Radio Bearers (DRBs) are resumed. Furthermore, the message includes the Resume Id and, if applicable, updated L2/1 parameters.

6. The UE and eNB resume the stored security context.

7. The eNB 102$_2$ (i.e., RAN node 102$_2$) notifies the MME 107 (i.e., CN node 107) about UE state change in a new S1AP message designated here as S1-AP UE Context Active. Evolved Packet System (EPS) Connection Management (ECM) in the MME enters the ECM-CONNECTED state. The MME identifies that the UE returns at the eNodeB 102$_2$ for which MME 107 has stored information about allocated downlink (DL) Tunnel Endpoint Identifiers (TEIDs) for the UE 104$_2$ (i.e., MS 104$_2$).

eNB 102$_2$ adds to the message a new Information Element/indication that UE 104$_2$ indicated on the RRC layer in e.g., step 4 that an Exception Report is to be sent.

8. The MME 107 sends a Modify Bearer Request message (eNodeB address, S1 TEID(s) (DL) for the accepted EPS bearers, Delay Downlink Packet Notification Request, RAT Type) per Packet Data Network (PDN) connection to the Serving Gateway (SGW) 107' (i.e., another CN node 107'). If the SGW 107' supports Modify Access Bearers Request procedure and if there is no need for the SGW 107' to send the signaling to the PGW 107', the MME 107 may send Modify Access Bearers Request (eNodeB address(es) and TEIDs for downlink user plane for the accepted EPS bearers, Delay Downlink Packet Notification Request) per UE $104_2$ to the SGW 107' to optimize the signaling. The SGW 107' is now able to transmit downlink data towards the UE $104_2$. The SGW 107' considers the UE $104_2$ to be in Connected state.

9. The SGW 107' provides a response to step 7.

10. The MME 107 acknowledges step 7.

11. Alternatively to transmission of message 4, if message 3 included User Plane and an indication that all User Plane is transmitted, the eNB $102_2$ can suspend the RRC connection and implicitly indicate that the User Plane was successfully received.

In the second embodiment, the MME 107 ('C-SGN' 107) (i.e., CN node 107) forwards the indication about the Exception Report to the P-GW 107' (i.e., another CN node 107') using GTP Control Plane (GTP-C), e.g., by using a new GTP-C message.

In the third embodiment, the P-GW 107' (i.e., another CN node 107') uses that information about the amount of data being transferred as an Exception Report to enable adjustment of the CDRs according to an operator's policy taking possible business agreements into consideration.

In the fourth embodiment, the P-GW 107' (i.e., another CN node 107') reports usage of Exception Reporting to the PCC (e.g., PCRF) where an operator's local policy dependent actions can be triggered, e.g., change of the QoS parameters or policing procedures like 'UE Detach' when the usage of Exception Reporting is not allowed.

In the fifth embodiment, the MME 107 ('C-SGN' 107) (i.e., CN node 107) triggers policing functions like 'UE Detach' taking an operator's local policies and/or subscription data into consideration.

In the six embodiment, the MME 107 (i.e., CN node 107) requests the S-GW 107' (i.e., another CN node 107') over the S11 interface using a new procedure or modified 'Modify Bearer' procedure (e.g., reference steps 8 and 9 of FIG. 5) to report the amount of data received from that UE $104_2$ on the uplink.

In the seventh embodiment, the MME 107 ('C-SGN' 107) (i.e., CN node 107) requests the S-GW 107' (i.e., another CN node 107') to stop reporting the amount of data being received from the UE $104_2$ on the uplink.

In the eighth embodiment (alternatively to embodiments six and seven), the MME 107 ('C-SGN' 107) (i.e., CN node 107) on the reception of S1AP UE Context Active indicating 'Exception Report', requests the S-GW 107' (i.e., another CN node 107') to start counting the amount of data received from the UE $104_2$ on the uplink.

In the ninth embodiment (alternatively to embodiments six and seven), the MME 107 ('C-SGN' 107) (i.e., CN node 107) on the reception of S1AP UE Context Deactive (referencing 3GPP TR 23.720) subsequent to the reception of the S1AP UE Context Active indicating 'Exception Report', requests the S-GW 107' to report the amount of counted data received from the UE $104_2$ since the last request was received from the MME 107 ('C-SGN' 107) to start counting. This can be a new procedure for the S11 interface or added to the modified procedure 'Release Access Bearer,' for example, as illustrated in steps 3 and 4 in FIG. 6. The 'Release Access Bearer' procedure before the proposed modification is illustrated as Suspension of a RRC Connection in FIG. 6.18.1.3-1 of 3GPP TR 23.720 referenced above.

Figure 6:
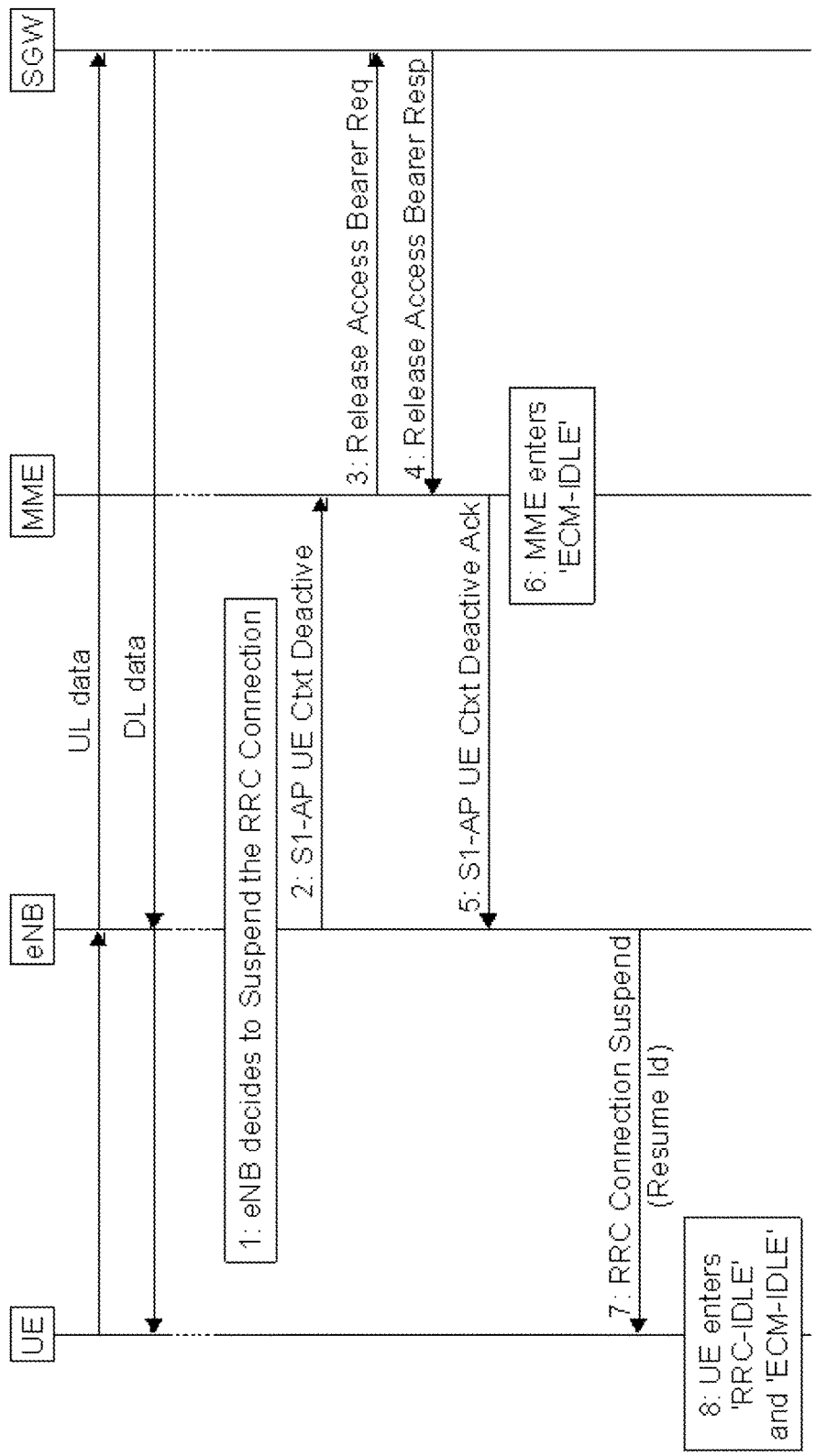
FIG. 6 is an illustration of the proposed modified 'Release Access Bearer' procedure wherein the MME requests the S-GW to report the amount of counted data received from the mobile station since the last request was received from the MME to start counting, in accordance with an embodiment of the present disclosure.

FIG. 6 illustrates the proposed modified 'Release Access Bearer' procedure as follows:

1. The network decides to suspend the RRC Connection.
2. The eNB $102_2$ indicates to the MME 107 with a new S1AP message that the UE's $104_2$ RRC connection is suspended. The MME 107 and eNB $102_2$ store the S1AP association and the related UE Contexts. The MME 107 enters ECM state ECM-IDLE. The MME 107 stores the DL TEIDs associated with the UE $104_2$ and eNB $102_2$.
3. The MME 107 sends a Release Access Bearers Request (Abnormal Release of Radio Link Indication or 'new cause') message to the SGW 107' that requests the release of all S1-U bearers for the UE $104_2$. The SGW 107' considers the UE $104_2$ to be in Idle state.
   The MME 107 indicates 'stop counting' and requests the SGW 107' to provide the amount of counted data.
   NOTE: Whether Release Access Bearers Request message comprises existing cause value or a new cause value will be decided by CT4.
4. The SGW 107' provides a response to the step 3.
   The SGW 107' provides the amount of counted data.
5. The MME 107 acknowledges step 2.
6. The MME 107 enters 'ECM-IDLE' state.
7. The eNB $102_2$ suspends the RRC Connection towards the UE $104_2$. An identifier that is used at subsequent resumption of that suspended RRC Connection can be provided. The UE $104_2$ and the eNB $102_2$ store the related Context information, i.e., RRC configuration, bearer configuration (including Robust Header Compression (RoHC) state information), Access Stratum Security Context and L2/1 parameters when applicable. This message also comprises the security algorithm configuration and the Next Hop Chaining Counter (NCC) associated with the K_eNB security key that is to be used at subsequent resumption.
8. The UE $104_2$ RRC layer enters RRC-IDLE state where it stores the relevant Access Stratum (AS) information (step 7) and the UE $104_2$ Non Access Stratum (NAS) layer enters ECM-IDLE state where it is aware that a NAS signaling connection is available.

Solution for 'Solution 2'

In the first embodiment, the eNB $102_2$ (i.e., RAN node $102_2$) adds a new Information Element to the S1AP protocol used when NAS PDU carrying an Exception Report is sent over the S1AP interface (or modified S1AP interface) to the MME 107' (or 'C-SGN' 107') (i.e., another CN node 107').

In this first embodiment, it is the 'Initial UE message' message sent by the eNB $102_2$ to transfer the initial layer 3 message to the MME 107 over the S1 interface and it comprises the NAS-PDU received from the device/MS $104_2$, as illustrated in FIG. 7.

The 'Initial UE message' message before the addition of the proposed new IE is illustrated in Section 9.1.7.1 of 3GPP TS 36.413 v13.1.0 (2015-12) entitled "Technical Specification Group Radio Access Network; Evolved Universal Terrestrial Radio Access Network (E-UTRAN); S1 Application Protocol (S1AP) (Release 13)" (herein 3GPP TS 36.413), the contents of which are hereby incorporated by reference herein for all purposes. FIG. 7 illustrates the 'Initial UE message' message with the addition of the proposed new IE.

In the second embodiment, the eNB $102_2$ (i.e., RAN node $102_2$) adds a new Information Element to the S1AP protocol used when NAS PDU carrying an Exception Report is sent over the S1AP interface (or modified S1AP interface) to the MME 107' (or 'C-SGN' 107') (i.e., another CN node 107').

In this second embodiment, it is the 'Uplink NAS Transport' message sent by the eNB $102_2$ and is used for carrying NAS information over the S1 interface, as illustrated in FIG. 8. The 'Uplink NAS Transport' message before the addition of the proposed new IE is illustrated in Section 9.1.7.3 of 3GPP TS 36.413 referenced above. FIG. 8 illustrates the 'Uplink NAS Transport' message with the addition of the proposed new IE.

Basic Functionalities-Configurations of RAN Node 102₂ (for Example) and CN Node 107 (for Example)

Figure 9:
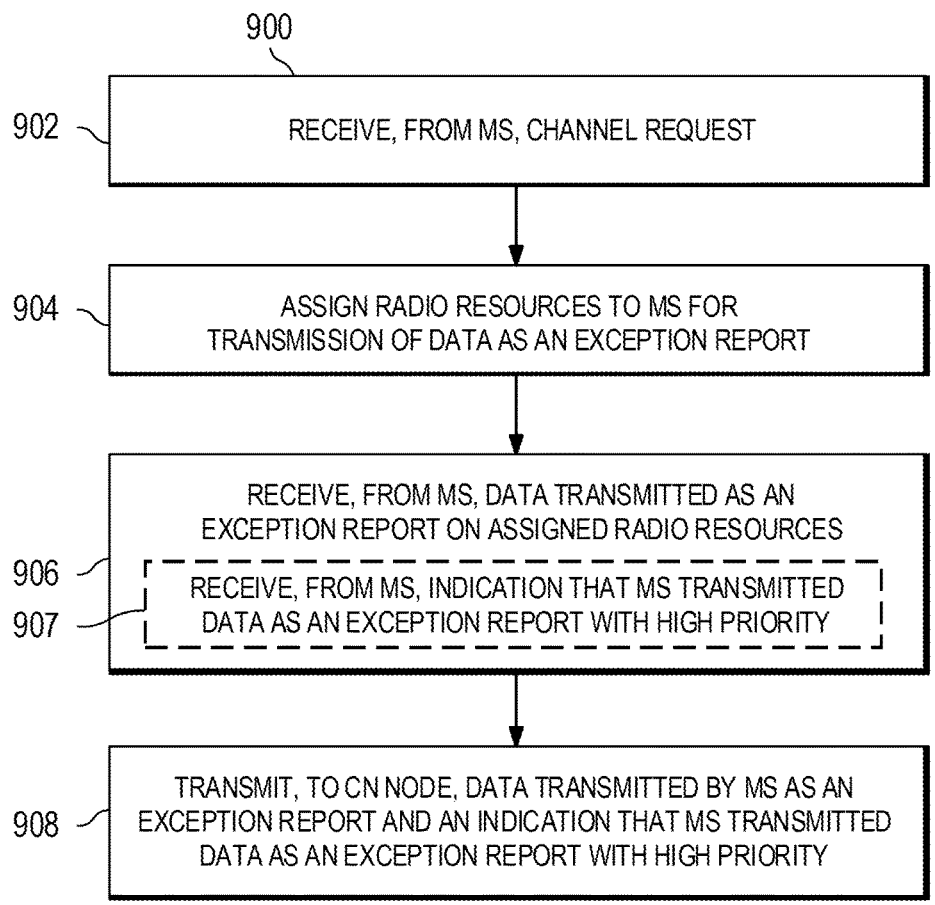
FIG. 9 is a flowchart of a method implemented in the RAN node in accordance with an embodiment of the present disclosure.

Referring to FIG. 9, there is a flowchart of a method 900 implemented in the RAN node 102₂ (e.g., BSS 102₂, eNB 102₂) configured to communicate with a MS 104₂ (e.g., wireless device 104₂, MTC device 104₂, CIoT device 104₂) and a CN node 107 (e.g., SGSN 107, MME 107, C-SGN 107) in accordance with an embodiment of the present disclosure. At step 902, the RAN node 102₂ receives, from the MS 104₂, a channel request 202. In some embodiments, the channel request 202 may indicate high priority for transmitting data as an exception report, for example, as discussed with reference to Note 1 of FIG. 2.

At step 904, the RAN node 102₂ assigns radio resources to the MS 104₂ for transmission of data as an exception report. In some embodiments e.g., Note 1 of FIG. 2, the RAN node 102₂ assigns radio resources to the MS 104₂ for transmission of data as an exception report with high priority in response to receiving an indication of high priority in the channel request 202.

At step 906, the RAN node 102₂ receives, from the MS104₂, data 206 transmitted as an exception report on the assigned radio resources. In some embodiments, at optional step 907, the indication that the MS104₂ transmitted data as an exception report with high priority is received, by the RAN node 102₂, along with the data 206 transmitted as an exception report. The indication may be signaled using a reserved Service Access Point Identifier (SAPI) value included in a Logical Link Control (LLC) PDU carrying the data 206 transmitted by the MS 104₂ as an exception report.

At step 908, the RAN node 102₂ transmits, to the CN node 107, the data transmitted by the MS 104₂ as an exception report and an indication that the MS 104₂ transmitted data as an exception report with high priority. In a first embodiment, the indication is transmitted, to the CN node 107, in an IE included in a second PDU carrying a first PDU transmitted by the MS 104₂. The IE may be an Exception Report Flag included in an UL-UNITDATA PDU carrying a LLC PDU transmitted by the MS 104₂. The LLC PDU may have been sent by the MS 104₂ using an uplink EC-EGPRS Temporary Block Flow (TBF) established in response to an EC-EGPRS PACKET CHANNEL REQUEST message or an EC-EG-PRS PACKET DOWNLINK ACK/NACK message including a channel request. In another embodiment, the indication is transmitted, to the CN node 107, using a reserved code point in an UL-UNITDATA PDU IE. For example, the indication may be transmitted using the previously reserved code point 101 of the Precedence field in the QoS Profile IE, as illustrated in the updated version of Table 11.3.28.b from 3GPP TS 48.018 referenced above. In a further embodiment, as discussed above with reference to optional step 907, the indication may be signaled using a reserved SAPI value included in an LLC PDU transmitted by the MS 104₂, wherein the indication is then transmitted, from the RAN node 102₂ to the CN node 107, in an UL-UNITDATA PDU carrying the LLC PDU. For example, the indication may be signaled using the previously reserved SAPI value 1010, as illustrated in the modified allocation of SAPI values in Table 1 above.

Figure 10:
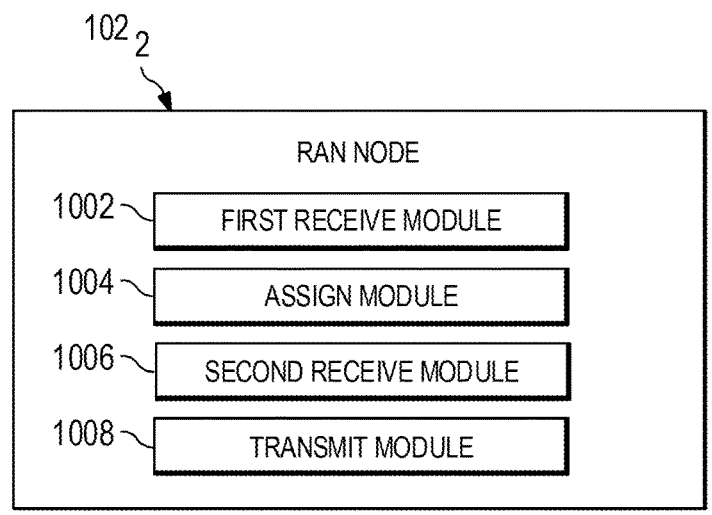
FIG. 10 is a block diagram illustrating a structure of the RAN node configured in accordance with an embodiment of the present disclosure.

Referring to FIG. 10, there is a block diagram illustrating structures of an exemplary RAN node 102₂ (e.g., BSS 102₂, eNB 102₂) in accordance with an embodiment of the present disclosure. In one embodiment, the RAN node 102₂ comprises a first receive module 1002, an assign module 1004, a second receive module 1006, and a transmit module 1008. The first receive module 1002 is configured to receive, from the MS 104₂ (e.g., wireless device 104₂, MTC device 104₂, CIoT device 104₂), a channel request 202. The assign module 1004 is configured to assign radio resources to the MS 104₂ for transmission of data as an exception report. The second receive module 1006 is configured to receive, from the MS 104₂, data 206 transmitted as an exception report on the assigned radio resources. The transmit module 1008 is configured to transmit, to a CN node 107 (e.g., SGSN 107, MME 107, C-SGN 107), the data transmitted by the MS 104₂ as an exception report and an indication that the MS 104₂ transmitted data as an exception report with high priority. In addition, it should be noted that the RAN node 102₂ may also include other components, modules or structures which are well-known, but for clarity, only the components, modules or structures needed to describe the features of the present disclosure are described herein.

As those skilled in the art will appreciate, the above-described modules 1002, 1004, 1006, and 1008 of the RAN node 102₂ may be implemented separately as suitable dedicated circuits. Further, the modules 1002, 1004, 1006, and 1008 can also be implemented using any number of dedicated circuits through functional combination or separation. In some embodiments, the modules 1002, 1004, 1006, and 1008 may be even combined in a single application specific integrated circuit (ASIC). As an alternative software-based implementation, the RAN node 102₂ may comprise a memory 134₂, a processor 132₂ (including but not limited to a microprocessor, a microcontroller or a Digital Signal Processor (DSP), etc.) and a transceiver 122₂. The memory 134₂ stores machine-readable program code executable by the processor 132₂ to cause the RAN node 102₂ to perform the steps of the above-described method 1000. Note: the other RAN node 102₁ (plus other RAN nodes not shown) may be configured the same as RAN node 102₂.

Figure 11:
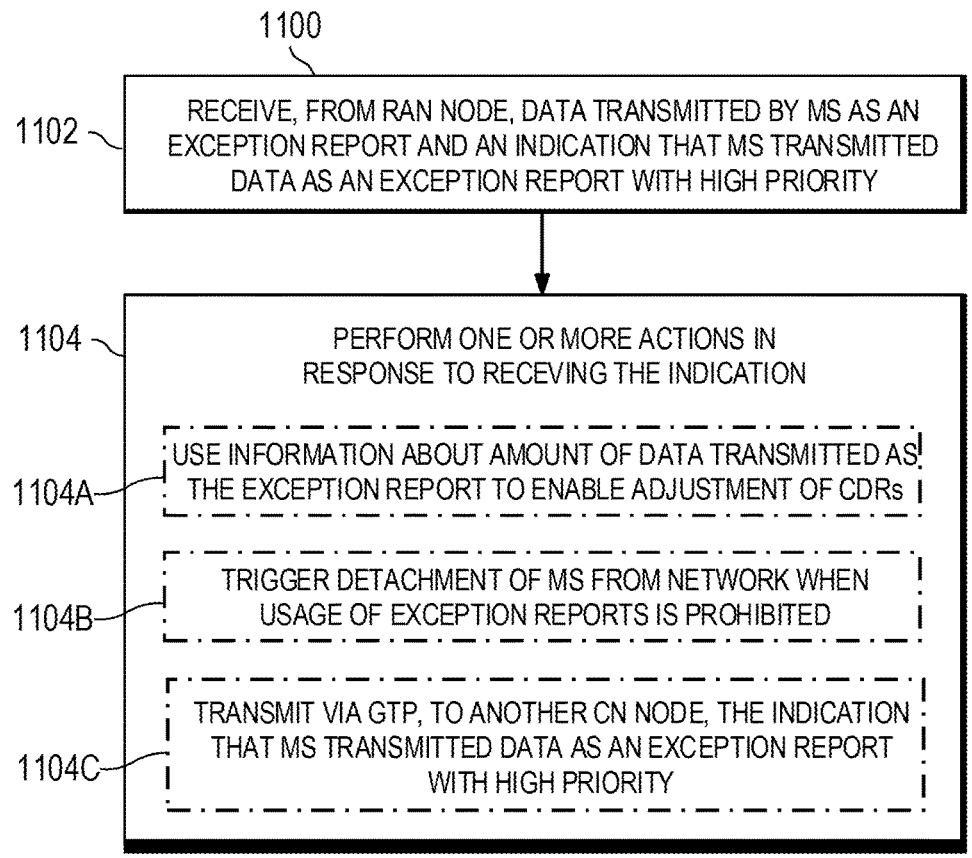
FIG. 11 is a flowchart of a method implemented in the CN node in accordance with an embodiment of the present disclosure.

Referring to FIG. 11, there is a flowchart of a method 1100 implemented in the CN node 107 (e.g., SGSN 107, MME 107, C-SGN 107) configured to communicate with a RAN node 102₂ (e.g., BSS 102₂, eNB 102₂) and an MS 104₂ (e.g., wireless device 104₂, MTC device 104₂, CIoT device 104₂) in accordance with an embodiment of the present disclosure. At step 110₂, the CN node 107 receives, from the RAN node 102₂, data transmitted by the MS 104₂ as an exception report and an indication that the MS 104₂ transmitted data as an exception report with high priority. In a first embodiment, the indication is received, from the RAN node 102₂, in an IE included in a second PDU carrying a first PDU transmitted by the MS 104₂. The IE may be an Exception Report Flag included in an UL-UNITDATA PDU carrying a LLC PDU transmitted by the MS 104₂. In another embodiment, the indication is received, from the RAN node 102₂, using a reserved code point in an UL-UNITDATA PDU IE. For example, the indication may be received using the previously reserved code point 101 of the Precedence field in the QoS Profile IE, as illustrated in the updated version of Table 11.3.28.b from 3GPP TS 48.018 referenced above. In a further embodiment, the indication may be signaled using a reserved SAPI value included in an LLC PDU transmitted by the MS 104₂ to the RAN node 102₂, wherein the indication is then received, from the RAN node 102₂, in an UL-UNITDATA PDU carrying the LLC PDU. For example, the indication may be signaled using the previously reserved SAPI value 1010, as illustrated in the modified allocation of SAPI values in Table 1 above.

At step 1104, the CN node 107 performs one or more actions in response to receiving the indication. In one embodiment, at step 1104A, performing one or more actions includes using information about an amount of the data transmitted as the exception report with high priority to enable adjustment of Charging Data Records (CDRs) associated with the MS $104_2$ according to an operator's policy or business agreements. Alternatively or in addition, at step 1104B, the CN node 107 is configured to communicate with the RAN node $102_2$ and the MS $104_2$ in a network 100, and performing one or more actions includes triggering detachment of the MS $104_2$ from the network 100 when usage of exception reports is prohibited. Alternatively or in addition, at step 1104C, the CN node 107 is further configured to communicate with another CN node 107' (e.g., GGSN 107', S-GW 107', P-GW 107'), and performing one or more actions includes transmitting via GPRS Tunnelling Protocol (GTP), to the another CN node 107', the indication that the MS $104_2$ transmitted data as the exception report with high priority. The transmission via GTP of the indication, to the another CN node 107', may cause the another CN node 107' to perform one or more actions. In one example, the transmission of the indication may cause the another CN node 107' to adjust CDRs associated with the MS $104_2$ according to an operator's policy or business agreements. In another example, the transmission of the indication may cause the another CN node 107' to report the MS's $104_2$ usage of exception reporting to a Policy and Charging Control (PCC) architecture.

Figure 12:
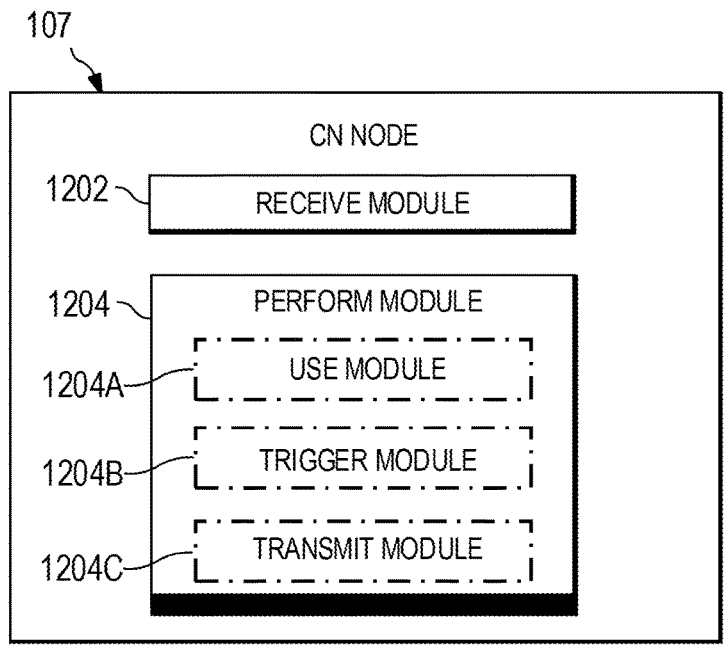
FIG. 12 is a block diagram illustrating a structure of the CN node configured in accordance with an embodiment of the present disclosure.

Referring to FIG. 12, there is a block diagram illustrating structures of an exemplary CN node 107 (e.g., SGSN 107, MME 107, C-SGN 107) in accordance with an embodiment of the present disclosure. In one embodiment, the CN node 107 comprises a receive module $120_2$ and a perform module 1204. The receive module $120_2$ is configured to receive, from the RAN node $102_2$ (e.g., BSS $102_2$, eNB $102_2$), data transmitted by the MS $104_2$ (e.g., wireless device $104_2$, MTC device $104_2$, CIoT device $104_2$) as an exception report and an indication that the MS $104_2$ transmitted data as an exception report with high priority. The perform module 1204 is configured to perform one or more actions in response to receiving the indication. In one embodiment, the perform module 1204 comprises a use module 1204A, which is configured to use information about an amount of the data transmitted as the exception report with high priority to enable adjustment of CDRs associated with the MS $104_2$ according to an operator's policy or business agreements. Alternatively or in addition, the CN node 107 is configured to communicate with the RAN node $102_2$ and the MS $104_2$ in a network 100, and the perform module 1204 comprises a trigger module 1204B, which is configured to trigger detachment of the MS $104_2$ from the network 100 when usage of exception reports is prohibited. Alternatively or in addition, the CN node 107 is further configured to communicate with another CN node 107' (e.g., GGSN 107', S-GW 107', P-GW 107'), and the perform module 1204 comprises a transmit module 1204C, which is configured to transmit via GTP, to the another CN node 107', the indication that the MS $104_2$ transmitted data as the exception report with high priority. The transmission via GTP of the indication, to the another CN node 107', may cause the another CN node 107' to perform one or more actions. In addition, it should be noted that the CN node 107 may also include other components, modules or structures which are well-known, but for clarity, only the components, modules or structures needed to describe the features of the present disclosure are described herein.

As those skilled in the art will appreciate, the above-described modules 1202, 1204, 1204A, 1204B, and 1204C of the CN node 107 may be implemented separately as suitable dedicated circuits. Further, the modules 1202, 1204, 1204A, 1204B, and 1204C can also be implemented using any number of dedicated circuits through functional combination or separation. In some embodiments, the modules 1202, 1204, 1204A, 1204B, and 1204C may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 1100. Note: other CN nodes may be configured the same as CN node 107.

In view of the foregoing, one skilled in the art will appreciate that the present disclosure has many advantages some of which are as follows:

The CN node is made aware of when an MS has sent a report that has been treated as a high priority report on the radio interface. This in turn means that the CN node can use this information for charging purposes or other means to limit the misuse of uplink data transmissions treated as exception reports when sent across the radio interface.

The RAN node is made aware of when an MS is requesting the transmission of a report to be treated as a high priority report on the radio interface. This is turn means that the RAN node can use this information for prioritizing the allocation of radio resources in support of such transmissions.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A radio access network (RAN) node configured to communicate with a mobile station and a core network (CN) node, the RAN node comprising:
a processor; and,
a memory that stores processor-executable instructions, wherein the processor interfaces with the memory to execute the processor-executable instructions, whereby the RAN node is operable to:
receive, from the mobile station, a channel request;
assign radio resources to the mobile station for transmission of data;
after assigning radio resources, receive, from the mobile station, data transmitted as an exception report on the assigned radio resources and an indication that the mobile station transmitted data as an exception report with high priority; and
transmit, to the CN node, the data transmitted by the mobile station as an exception report and the indication that the mobile station transmitted data as an exception report with high priority,
wherein the indication is transmitted, to the CN node, in an Exception Report Flag Information Element (IE) included in an Uplink (UL)—UNITDATA Protocol Data Unit (PDU) carrying a Logical Link Control (LLC) PDU transmitted by the mobile station, and wherein the LLC PDU was sent by the mobile station using an uplink Extended Coverage—Enhanced General Packet Radio Service (EC-EGPRS) Temporary Block Flow (TBF) established in response to an EC-EGPRS PACKET CHANNEL REQUEST message or an EC-EGPRS PACKET DOWNLINK Acknowledgement/Negative Acknowledgement (ACK/NACK) message including a channel request.

2. A method in a radio access network (RAN) node configured to communicate with a mobile station and a core network (CN) node, the method comprising:
receiving, from the mobile station, a channel request;
assigning radio resources to the mobile station for transmission of data;
after assigning radio resources, receiving, from the mobile station, data transmitted as an exception report on the assigned radio resources and an indication that the mobile station transmitted data as an exception report with high priority; and
transmitting, to the CN node, the data transmitted by the mobile station as an exception report and the indication that the mobile station transmitted data as an exception report with high priority,
wherein the indication is transmitted, to the CN node, in an Exception Report Flag Information Element (IE) included in an Uplink (UL)—UNITDATA Protocol Data Unit (PDU) carrying a Logical Link Control (LLC) PDU transmitted by the mobile station, and wherein the LLC PDU was sent by the mobile station using an uplink Extended Coverage—Enhanced General Packet Radio Service (EC-EGPRS) Temporary Block Flow (TBF) established in response to an EC-EGPRS PACKET CHANNEL REQUEST message or an EC-EGPRS PACKET DOWNLINK Acknowledgement/Negative Acknowledgement (ACK/NACK) message including a channel request.

3. A core network (CN) node configured to communicate with a radio access network (RAN) node and a mobile station, the CN node comprising:
a processor; and,
a memory that stores processor-executable instructions, wherein the processor interfaces with the memory to execute the processor-executable instructions, whereby the CN node is operable to:
receive, from the RAN node, data transmitted by the mobile station as an exception report and an indication that the mobile station transmitted data as an exception report with high priority; and
perform one or more actions in response to receiving the indication, wherein the one or more actions include one or more of enabling adjustment of Charging Data Records (CDRs) associated with the mobile station or transmitting the indication to another CN node to cause the another CN node to adjust the CDRs,
wherein the indication is received, from the RAN node, in an Exception Report Flag Information Element (IE) included in an Uplink (UL)—UNITDATA Protocol Data Unit (PDU) carrying a Logical Link Control (LLC) PDU transmitted by the mobile station, and wherein the LLC PDU was sent by the mobile station using an uplink Extended Coverage—Enhanced General Packet Radio Service (EC-EGPRS) Temporary Block Flow (TBF) established in response to an EC-EGPRS PACKET CHANNEL REQUEST message or an EC-EGPRS PACKET DOWNLINK Acknowledgement/Negative Acknowledgement (ACK/NACK) message including a channel request.

4. The CN node of claim 3, wherein enabling adjustment of the CDRs associated with the mobile station includes using information about an amount of the data transmitted as the exception report with high priority to enable adjustment of CDRs associated with the mobile station according to an operator's policy or business agreements.

5. The CN node of claim 3, wherein the CN node is configured to communicate with the RAN node and the mobile station in a network, and wherein the one or more actions further include triggering detachment of the mobile station from the network when usage of exception reports is prohibited.

6. The CN node of claim 3, wherein the CN node is further configured to communicate with the another CN node, and wherein transmitting the indication to the another CN node is via GPRS Tunnelling Protocol (GTP).

7. The CN node of claim 6, wherein transmission via GTP of the indication, to the another CN node, causes the another CN node to adjust the CDRs associated with the mobile station according to an operator's policy or business agreements.

8. The CN node of claim 6, wherein transmission via GTP of the indication, to the another CN node, causes the another CN node to report the mobile station's usage of exception reporting to a Policy and Charging Control (PCC) architecture.

9. A method in a core network (CN) node configured to communicate with a radio access network (RAN) node and a mobile station, the method comprising:

receiving, from the RAN node, data transmitted by the mobile station as an exception report and an indication that the mobile station transmitted data as an exception report with high priority; and performing one or more actions in response to receiving the indication, wherein the one or more actions include one or more of enabling adjustment of Charging Data Records (CDRs) associated with the mobile station or transmitting the indication to another CN node to cause the another CN node to adjust the CDRs, wherein the indication is received, from the RAN node, in an Exception Report Flag Information Element (IE) included in an Uplink (UL)—UNITDATA Protocol Data Unit (PDU) carrying a Logical Link Control (LLC) PDU transmitted by the mobile station, and wherein the LLC PDU was sent by the mobile station using an uplink Extended Coverage—Enhanced General Packet Radio Service (EC-EGPRS) Temporary Block Flow (TBF) established in response to an EC-EGPRS PACKET CHANNEL REQUEST message or an EC-EGPRS PACKET DOWNLINK Acknowledgement/Negative Acknowledgement (ACK/NACK) message including a channel request.

10. The method of claim 9, wherein enabling adjustment of the CDRs associated with the mobile station includes using information about an amount of the data transmitted as the exception report with high priority to enable adjustment of CDRs associated with the mobile station according to an operator's policy or business agreements.

11. The method of claim 9, wherein the CN node is configured to communicate with the RAN node and the mobile station in a network, and wherein performing one or more actions further include triggering detachment of the mobile station from the network when usage of exception reports is prohibited.

12. The method of claim 9, wherein the CN node is further configured to communicate with the another CN node, and wherein transmitting the indication to the another CN node is via GPRS Tunnelling Protocol (GTP).

13. The method of claim 12, wherein transmission via GTP of the indication, to the another CN node, causes the another CN node to adjust CDRs associated with the mobile station according to an operator's policy or business agreements.

14. The method of claim 12, wherein transmission via GTP of the indication, to the another CN node, causes the another CN node to report the mobile station's usage of exception reporting to a Policy and Charging Control (PCC) architecture.

* * * * *